United States Patent
Brake et al.

(10) Patent No.: US 9,160,762 B2
(45) Date of Patent: *Oct. 13, 2015

(54) VERIFYING APPLICATION SECURITY VULNERABILITIES

(71) Applicant: International Business Machines Corporation, Armonk, NY (US)

(72) Inventors: Nevon C. Brake, Kanata (CA); Paul Ionescu, Kanata (CA); Iosif Viorel Onut, Kanata (CA); John T. Peyton, Jr., Littleton, MA (US); Wayne Duncan Smith, Kanata (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/574,790

(22) Filed: Dec. 18, 2014

(65) Prior Publication Data

US 2015/0156216 A1      Jun. 4, 2015

Related U.S. Application Data

(63) Continuation of application No. 13/888,827, filed on May 7, 2013, now Pat. No. 8,935,794.

(30) Foreign Application Priority Data

May 18, 2012   (CA) ..................................... 2777434

(51) Int. Cl.
*H04L 29/06*     (2006.01)

(52) U.S. Cl.
CPC ................................. *H04L 63/1433* (2013.01)

(58) Field of Classification Search
CPC combination set(s) only.
See application file for complete search history.

(56) References Cited

U.S. PATENT DOCUMENTS

| 7,392,545 B1 | 6/2008 | Weber et al. |
| 2005/0108562 A1 | 5/2005 | Khazan et al. |

(Continued)

FOREIGN PATENT DOCUMENTS

CA        2777434 A1    11/2013

OTHER PUBLICATIONS

Petukhov, A., et al., "Detecting Security Vulnerabilities in Web Applications Using Dynamic Analysis with Penetration Testing," [online] Proceedings of the Application Security Conference, 2008, retrieved from the Internet: <https://owasp.com/images/3/3e/OWASP-AppSecEU08-Petukhov.pdf>, 16 pgs.

(Continued)

*Primary Examiner* — Beemnet Dada
(74) *Attorney, Agent, or Firm* — Cuenot, Forsythe & Kim, LLC

(57) ABSTRACT

Verifying application security vulnerabilities includes receiving a source code to analyze, performing a static analysis using the received source code and generating a vulnerability call trace for the received source code. Responsive to a determination that all static analysis results are not validated, mock objects are generated using the vulnerability call trace and a unit test is created using the generated mock objects. The unit test is executed using the generated mock objects and responsive to a determination that an identified vulnerability was validated; a next static analysis result is selected. Responsive to a determination that all static analysis results are validated, results and computed unit tests are reported.

20 Claims, 5 Drawing Sheets

(56) References Cited

U.S. PATENT DOCUMENTS

| | | |
|---|---|---|
| 2007/0240138 A1 | 10/2007 | Chess et al. |
| 2009/0282480 A1 | 11/2009 | Lee et al. |
| 2010/0083240 A1 | 4/2010 | Siman |
| 2010/0281248 A1 | 11/2010 | Lockhart et al. |
| 2011/0088016 A1 | 4/2011 | Ball et al. |
| 2011/0219447 A1 | 9/2011 | Horovitz et al. |
| 2012/0131668 A1 | 5/2012 | Berg et al. |
| 2013/0312102 A1 | 11/2013 | Brake et al. |

OTHER PUBLICATIONS

"SQL Injection—Veracode," [online] Veracode, Inc. © 2006-2013 [retrieved Apr. 27, 2011] retrieved from the Internet: <http://www.veracode.com/security/sql-injection>, 2 pgs.

U.S. Appl. No. 13/888,827, Notice of Allowance, Aug. 22, 2014, 8 pg.

Verification system 300

VERIFYING APPLICATION SECURITY VULNERABILITIES

CROSS-REFERENCE TO RELATED APPLICATIONS

This application is a Continuation of U.S. application Ser. No. 13/888,827, filed on May 7, 2013, which claims the benefit of Canada Application Number 2777434 filed on May 18, 2012, which is fully incorporated herein by reference.

BACKGROUND

Source code security analysis provides a capability of identifying application security flaws through analysis of the application code. The analysis typically searches for and locates paths from entry points to output points that do not contain validations for the input provided by a user. Static analysis source is a commonly used term for an entry point. For example Request.getParameter(name) is a source because the function enables retrieving input. Sink is a term used to represent sensitive locations where malicious input could arrive. For example a database or a response could be a sink. Trace refers to a path from a source to a sink created from a sequence comprising various function calls and operations.

Web application security scanning (WASS) provides a capability of identifying application security flaws by sending attacks to a target application and analyzing the responses generated to validate application vulnerabilities. The scanning is also referred to as dynamic analysis. Communication with the target application during Web application security scanning typically occurs using a secure hypertext transport protocol HTTP(S).

Unit testing is a common development practice, which provides input values to pre-determined functional components and validates the outputs received against an expected set of results. Source code security analysis typically produced a certain amount of false positives because a static analysis uses a set of assumptions to find vulnerabilities that a specific portion of code will react in a certain way. Thus, a method of verifying findings produced by static analysis typically used during unit testing also creates false positives.

Web application security scanning typically misses a percentage of vulnerabilities due to coverage issues. For example, rich Internet applications, containing a significant amount of client side logic can be very difficult to scan in an automated fashion. The hypertext transport protocol (HTTP) layer can also be very unstable and communication problems can therefore affect the duration of the scanning and the consistency of the results. WASS requires a full application to be deployed; however, as developers often only work on a smaller project and use unit tests to verify the functionality adds to difficulties in using WASS. Techniques used to correlate results of code analysis with web application scanning results can increase the confidence of results found by both techniques; however, the correlation will typically not provide useful information for results that are not matched.

BRIEF SUMMARY

According to one embodiment, a computer-implemented process for verifying application security vulnerabilities receives a source code to analyze, performs a static analysis using the received source code, generates a vulnerability call trace for the received source code, and determines whether all static analysis results are validated. Responsive to a determination that all static analysis results are not validated, mock objects are generated using the vulnerability call trace and a unit test is created using the generated mock objects. Using a processor, the unit test is executed using the generated mock objects. Using the processor, a determination is made whether an identified vulnerability was validated. Responsive to a determination that an identified vulnerability was validated, a next static analysis result is selected. Responsive to a determination that all static analysis results are validated, results and computed unit tests are reported.

According to another embodiment, a computer program product for verifying application security vulnerabilities comprises a computer recordable media containing computer executable program code stored thereon. The computer executable program code comprises computer executable program code for receiving a source code to analyze, computer executable program code for performing a static analysis using the received source code, computer executable program code for generating a vulnerability call trace for the received source code, computer executable program code for determining whether all static analysis results are validated, computer executable program code responsive to a determination that all static analysis results are not validated for generating mock objects using the vulnerability call trace, computer executable program code for creating a unit test using the generated mock objects, computer executable program code for executing the unit test using the generated mock objects, computer executable program code for determining whether an identified vulnerability was validated, computer executable program code responsive to a determination that an identified vulnerability was validated, for selecting a next static analysis result, and computer executable program code responsive to a determination that all static analysis results are validated, for reporting results and computed unit tests.

According to another embodiment, an apparatus for verifying application security vulnerabilities, comprises a communications fabric, a memory connected to the communications fabric, wherein the memory contains computer executable program code, a communications unit connected to the communications fabric, an input/output unit connected to the communications fabric, and a processor unit connected to the communications fabric. The processor unit executes the computer executable program code to direct the apparatus to receive a source code to analyze, perform a static analysis using the received source code, generate a vulnerability call trace for the received source code, determine whether all static analysis results are validated, and responsive to a determination that all static analysis results are not validated, generate mock objects using the vulnerability call trace. The processor unit executes the computer executable program code to further direct the apparatus to create a unit test using the generated mock objects, execute the unit test using the generated mock objects and determine whether an identified vulnerability was validated. The processor unit further executes the computer executable program code to direct the apparatus responsive to a determination that an identified vulnerability was validated, to select a next static analysis result, and responsive to a determination that all static analysis results are validated, to report results and computed unit tests.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
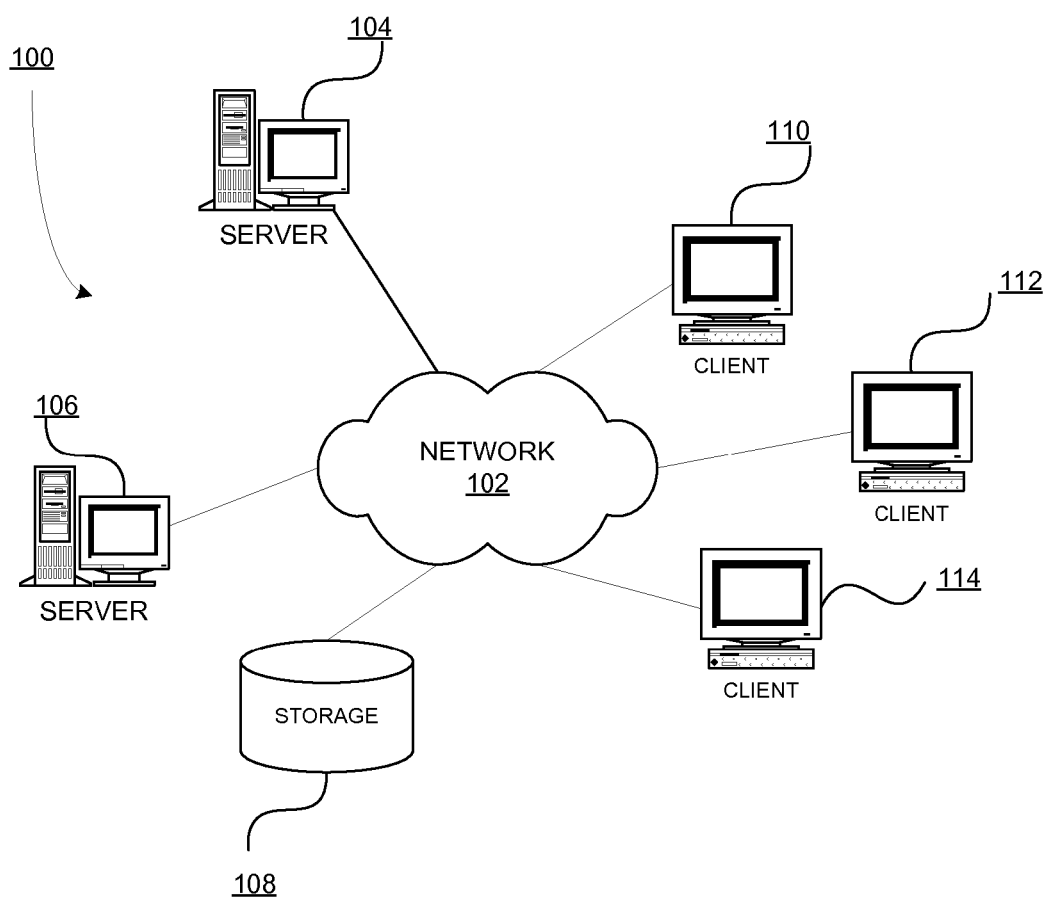
FIG. 1 is a block diagram of an exemplary network data processing system operable for various embodiments of the disclosure.

This disclosure relates generally to application security in a data processing system and more specifically to verifying application security vulnerabilities in the data processing system.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage medium(s) may be utilized. A computer-readable data storage medium may be, for example, but not limited to, an electronic, magnetic, optical, or semiconductor system, apparatus, or device, or any suitable combination of the foregoing. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing. In the context of this document, a computer-readable data storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
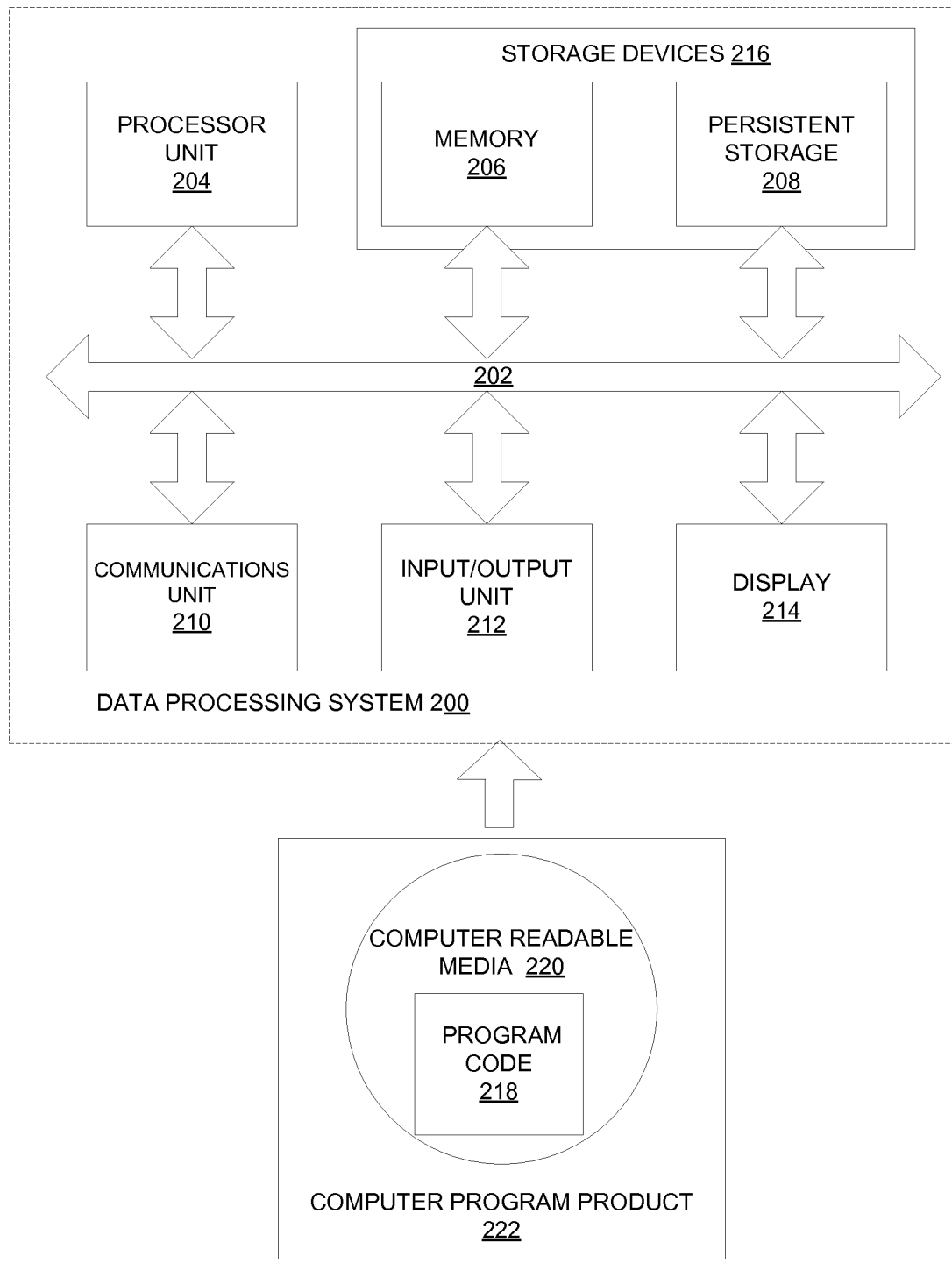
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for verifying application security vulnerabilities is presented. Processor unit 204 receives a source code to analyze, from communications unit 210, input/output unit 212 or storage devices 216, performs a static analysis using the received source code and generates a vulnerability call trace for the received source code, wherein the vulnerability call trace is maintained in storage devices 216. Responsive to a determination that all static analysis results are not validated, mock objects are generated by processor unit 204 using the vulnerability call trace. Processor unit 204 creates a unit test using the generated mock objects. The unit test is executed processor unit 204 using the generated mock objects and responsive to a determination that an identified vulnerability was validated; a next static analysis result is selected. Responsive to a determination that all static analysis results are validated, results and computed unit tests are reported using processor unit 204.

Embodiments of the disclosure provide a capability for validating static analysis findings through dynamic execution of application code in a context of a unit test. Dynamic analysis in the embodiments do not execute through an HTTP layer, removing a requirement for an application to be deployed and also removing challenges associated with execution of client side code or inconsistency associated with HTTP traffic.

Embodiments of the disclosure leverage information provided by a static analysis engine to construct a vulnerable call trace. The vulnerable call trace is executed in a context of an integrated development environment of a developer, potentially as part of a unit tests framework (for example JUnit, a framework which is an open-source project hosted on Sourceforge.net) or by providing a custom framework for these types of tests. A dynamic analysis engine constructs inputs provided to the test and to validate outputs as being vulnerable.

Embodiments of the disclosure exercise the identified vulnerability code, detected by static analysis, in a dynamic manner through unit tests. The dynamic analysis occurs without HTTP traffic or the application being fully deployed. Static analysis focuses the dynamic analysis testing scope on all code paths that are suspect of having vulnerabilities. Embodiments of the disclosure produce reusable security unit tests fashioned specifically for a target application.

Figure 3:
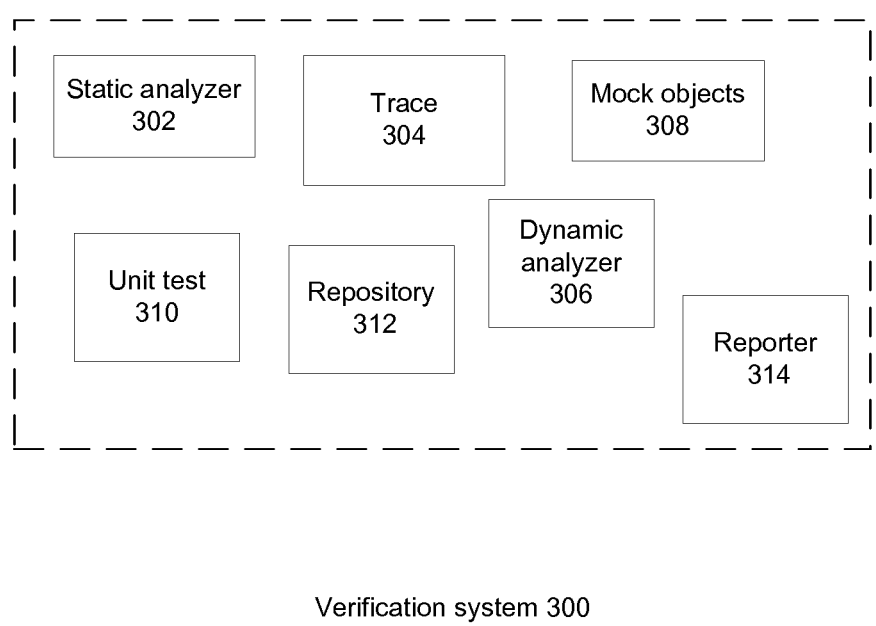
FIG. 3 is a block diagram of a verification system operable for various embodiments of the disclosure.

With reference to FIG. 3 a block diagram of a verification system operable for various embodiments of the disclosure is presented. Verification system 300 is an example of an embodiment of the disclosure.

Verification system 300 leverages support of an underlying data processing system, for example network data processing system 100 of FIG. 1 or data processing 200 of FIG. 2 for conventional support including communication, processing, input/output, presentation and data storage, management and retrieval services. A number of functional elements comprise verification system 300 including static analyzer 302, trace 304, dynamic analyzer 306, mock objects 308, unit test 310, repository 312 and reporter 314. The functional components may be implemented as various combinations, as discrete components or as a unit representing a logical or physical structure without impacting overall functional capability.

Verification system 300 provides a capability for validating static analysis findings through dynamic execution of application code in a context of a unit test. An embodiment of verification system 300 provides and manages the set of components to deliver the described capability.

Static analyzer 302 provides a capability of receiving source code for analysis and performing an analysis of the received source code to generate a trace. A static analysis trace generated by static analyzer 302 provides information for a specific code path that an input, provided by a user, will take from a source to a sink to produce vulnerability. A user in this context may be a human user or another function. Static analyzer 302 acts as an exploratory tool to locate and define all potential paths to be verified.

Trace 304 is the output of static analyzer 302. As previously stated a trace is set of all potential paths in a portion of source code provided as input to static analyzer 302 to be verified. Trace 304 defines a path from a source to a sink created from a sequence comprising various function calls and operations of an analyzed code portion. An example of a simplified trace is provided in FIG. 4 and described later. Trace 304 is used as input for subsequent processing by dynamic analyzer 306.

Figure 4:
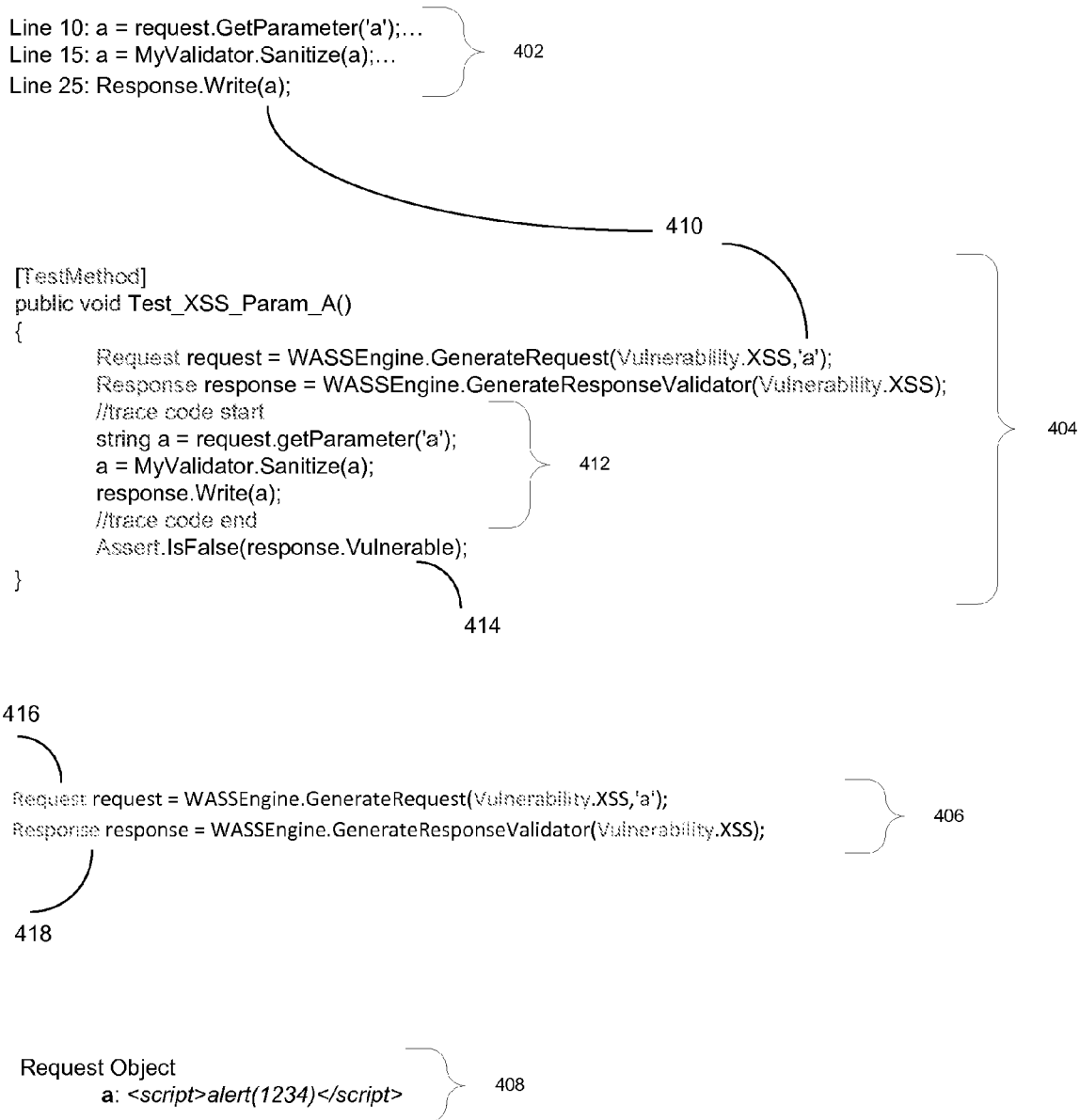
FIG. 4 is a textual representation of code snippets used with the verification system of FIG. 3 operable for various embodiments of the disclosure.

Dynamic analyzer 306 provides a capability of receiving input in the form of trace 304 and converting the received input into a test method as part of a unit test. Dynamic analyzer 306 generates an attack on a specified input parameter and validates whether the attack succeeded. In the example of FIG. 4, dynamic analyzer 306 produces two mock objects in the form of a request and a response used rather than using an actual request and response. Dynamic analyzer 306 further provides a capability of executing the unit test including the converted trace information.

Mock objects 308 generated by dynamic analyzer 306 are replacements for each actual input and actual output (request and response in the current example) received in trace 304. Unit test 310 provides a capability to dynamically exercise the code portion being analyzed to verify the vulnerability suspected. The test method generated may be a part of a unit test framework or individual test case, which is manually executed or automatically executed as needed.

Repository 312 provides a capability to persist objects created and used during operation of verification system 300. Repository 312 is a data storage data structure capable of storing, managing and retrieving objects contained therein. For example, mock objects 308, unit test 310, trace 304 may be saved and retrieved using repository 312.

Repository 312 may also contain specialized input and out values used in further verification, for example when request object is processed by a filter prior to an application receiving the input or when a response object is processed by a filter prior to the result being passed to a waiting client. In another example, repository 312 may contain selectable response objects including a mock data base access mechanism to validate structured query language (SQL) injection, file system access or other types of sinks, as replacements for an actual response object.

Reporter 314 provides a capability to avail the output of validation testing and the computed unit tests to a requester. The requester may be a human user, for example a developer or the requester may be another application for example a report generator and a presentation service.

With reference to FIG. 4 a textual representation of code snippets used with the verification system of FIG. 3 operable for various embodiments of the disclosure is presented. Code snippets 400 represent an example of simplified code fragments as used with verification system 300 of FIG. 3.

The code snippets represented comprise example of a trace output 402, unit test 404, mock objects 406 and mutated request 408. Trace output 402 represents three lines of an analyzed code portion yielding instances of a parameter a 410, used as source, in a=request.GetParameter('a'), in a target sink a=MyValidator.Sanitize(a) and an output of Response.Write(a).

Trace 402 is converted into a test method as part of a unit test 404. The unit test is created to generate an attack on the input as defined in the trace received. Code block 412 represents the trace code portion of within the framework of unit test 404. Statement 414 Assert.IsFalse(response.Vulnerable); represents the verification condition to validate whether the attack succeeded. In the example the Response.Vulnerable property of statement 414 is true when the parameter a reaches the response unsanitized.

Mock objects 406 represent a request object 416 and a response object 418 that are used rather than an actual request and an actual response. A first call creates request object 416 providing a mutated request for the specified parameter as shown in mutated request 408. A second call creates response object 418 containing validation logic for the specified vulnerability. Depending on a sink type a response object may be replaced with a mock database access, file system access or other type of sinks.

Unit test 404 executes the dynamically generated code as an automated test case. When the test fails the vulnerability is verified. The test can be incorporated in an automated test framework without a need for running a full static analysis or a full dynamic analysis scan again to verify the code path.

There are certain aspects of a runtime environment that are invisible to static analysis. For example, in a J2EE environment, a J2EE container may insert filters into a processing path, processing the request object by a filter before being passed to the application code, and processing a response object by a filter before being sent back to an HTTP client. This type of processing is generally not visible to the static analysis processor, but may cause changes to both the request object and the response object to remove security issues. To accurately confirm a trace resulting from a static analyzer, the object created by a dynamic analyzer must recreate effects of the environment on the mock request object and mock response object used in the unit test.

Figure 5:
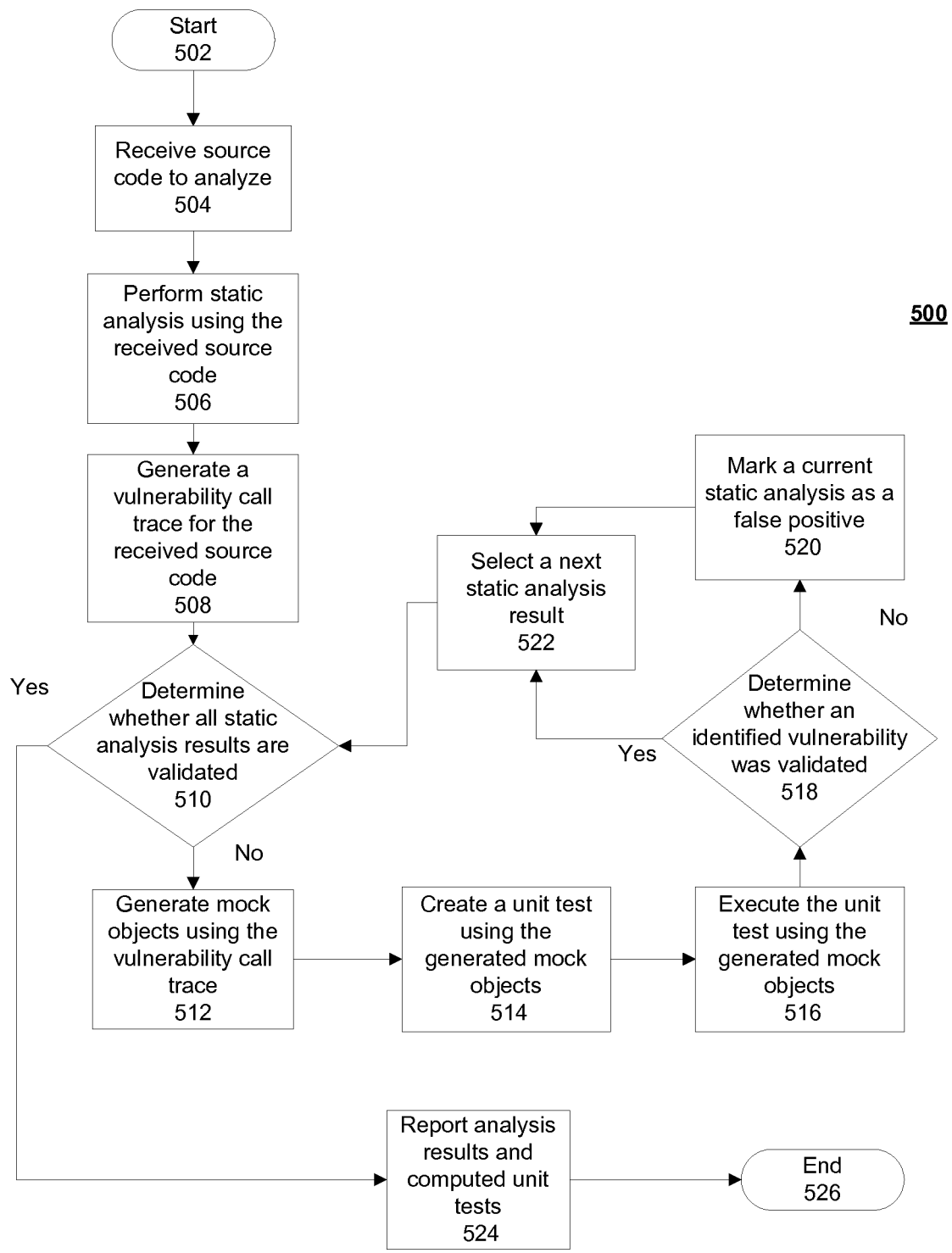
FIG. 5 is a flowchart of a verification process using the verification system of FIG. 3 operable for various embodiments of the disclosure.

With reference to FIG. 5 a flowchart of a verification process using the verification system of FIG. 3 operable for various embodiments of the disclosure is presented. Process 500 is an example of a verification process using verification system 300 of FIG. 3.

Process 500 begins (step 502) and receives source code to analyze (step 504). The source code comprises a set of statements in which may be found a sequence of calls in which request objects and associated response objects are defined for which a vulnerability assessment is required.

Process 500 performs static analysis using the received source code (step 506). Process 500 generates a vulnerability call trace for the received source code (step 508). A vulnerability trace defines a source to sink path within the analyzed code for an associated parameter.

Process 500 determines whether all static analysis results are validated (step 510). Responsive to a determination that all static analysis results are validated, process 500 reports results and computed unit tests (step 524) terminating thereafter (step 526). The results include the validation results for parameters tested using the call traces as well as the unit test output. The requests may be made available directly or indirectly to a user, wherein the user is human or another application.

Responsive to a determination that all static analysis results are not validated, process 500 generates mock objects using the vulnerability call trace (step 512). A mock object is created for each request object and each response object of a respect call trace instance.

Process 500 creates a unit test using the garneted mock objects (step 514). Process 500 executes the unit test using the generated mock objects (step 516). The unit test may be executed manually or programmatically and may be executed individually or as part of a unit test framework. Process 500 determines whether an identified vulnerability was validated (step 518).

Responsive to a determination that an identified vulnerability was not validated process 500 marks a current static analysis result as a false positive (step 520). Process 500 selects a next static analysis result (step 522) and loops back to perform step 510 as before. Responsive to a determination that an identified vulnerability was validated process 500 selects a next static analysis result (step 522) and loops back to perform step 510 as before.

Thus is presented in an illustrative embodiment a computer-implemented process for verifying application security vulnerabilities. The computer-implemented process receives a source code to analyze, performs a static analysis using the received source code and generates a vulnerability call trace for the received source code. The computer-implemented process determines whether all static analysis results are validated and responsive to a determination that all static analysis results are not validated, generates mock objects using the vulnerability call trace. A unit test is created using the generated mock objects and executed by the computer-implemented process using the generated mock objects. The computer-implemented process determines whether an identified vulnerability was validated and responsive to a determination that an identified vulnerability was validated, selects a next static analysis result. Responsive to a determination that all static analysis results are validated, the computer-implemented process reports results and computed unit tests.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage medium having computer executable instructions stored thereon in a variety of forms. Examples of computer readable data storage media include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented process for verifying application security vulnerabilities of a source code, comprising:
    generating, responsive to all static analysis results not being validated, mock objects using a vulnerability call trace for the source code;
    creating a unit test using the generated mock objects;
    executing the unit test using the generated mock objects to determine whether an identified vulnerability was validated; and
    selecting, responsive to a determination that the identified vulnerability was validated, a next static analysis result.
2. The process of claim 1, further comprising:
    identifying, in the source code, an entry point and a corresponding sensitive location for potentially malicious user input in a path suspected to have vulnerabilities.
3. The process of claim 1, wherein
    the vulnerability call trace is generated by identifying a path, suspected to have vulnerabilities, defining a sequence comprising a set of function calls and operations from an entry point associated with a user input to a corresponding sensitive location for potentially malicious user input.
4. The process of claim 1, wherein
    the creating the unit test includes:
        converting the vulnerability call trace into a test method,
        creating a mock request object representing a mutated request object for a specified parameter of a request object identified in the vulnerability call trace, and
        creating a mock response object representing a mutated response object for a corresponding request object identified in the vulnerability call trace, and
    the mock response object contains validation logic for a specified vulnerability.
5. The process of claim 4, wherein
    the creating the mock response object includes selectively replacing the request object identified in the vulnerability call trace with one of:
        a mock database access mechanism,
        a file system access, and
        a specified type of sink.
6. The process of claim 1, wherein
    the executing the unit test includes modifying the generated mock objects to incorporate changes caused by filters in a processing path,
    the processing path processes:
        a request object by a filter before being passed to an application code, and
        a response object by a filter before being sent back to an HTTP client, to recreate effects of an environment on a mock request object and a mock response object used in the unit test.
7. A computer program product for verifying application security vulnerabilities of a source code, comprising:
    a computer recordable storage medium having stored therein computer executable program code, which when executed by a computer hardware system, causes the computer hardware system to perform:
        generating, responsive to all static analysis results not being validated, mock objects using a vulnerability call trace for the source code;
        creating a unit test using the generated mock objects;
        executing the unit test using the generated mock objects to determine whether an identified vulnerability was validated; and
        selecting, responsive to a determination that the identified vulnerability was validated, a next static analysis result.
8. The computer program product of claim 7, wherein the computer executable program code further causes the computer hardware system to perform:
    identifying, in the source code, an entry point and a corresponding sensitive location for potentially malicious user input in a path suspected to have vulnerabilities.
9. The computer program product of claim 7, wherein
    the vulnerability call trace is generated by identifying a path, suspected to have vulnerabilities, defining a sequence comprising a set of function calls and operations from an entry point associated with a user input to a corresponding sensitive location for potentially malicious user input.
10. The computer program product of claim 7, wherein
    the creating the unit test includes:
        converting the vulnerability call trace into a test method,
        creating a mock request object representing a mutated request object for a specified parameter of a request object identified in the vulnerability call trace, and
        creating a mock response object representing a mutated response object for a corresponding request object identified in the vulnerability call trace, and the mock response object contains validation logic for a specified vulnerability.

11. The computer program product of claim 10, wherein the creating the mock response object includes selectively replacing the request object identified in the vulnerability call trace with one of:
   a mock database access mechanism,
   a file system access, and
   a specified type of sink.

12. The computer program product of claim 7, wherein the computer executable program code further causes the computer hardware system to perform:
   marking, responsive to a determination that an identified vulnerability was not validated, a current static analysis as a false positive.

13. The computer program product of claim 7, wherein the executing the unit test includes modifying the generated mock objects to incorporate changes caused by filters in a processing path,
   the processing path processes:
      a request object by a filter before being passed to an application code, and
      a response object by a filter before being sent back to an HTTP client, to recreate effects of an environment on a mock request object and a mock response object used in the unit test.

14. An apparatus for verifying application security vulnerabilities of a source code:
   at least one hardware processor, wherein the at least one hardware processor is configured to initiate and/or perform:
      generating, responsive to all static analysis results not being validated, mock objects using a vulnerability call trace for the source code;
      creating a unit test using the generated mock objects;
      executing the unit test using the generated mock objects to determine whether an identified vulnerability was validated; and
      selecting, responsive to a determination that the identified vulnerability was validated, a next static analysis result.

15. The apparatus of claim 14, wherein the at least one hardware processor is further configured to initiate and/or perform:
   identifying, in the source code, an entry point and a corresponding sensitive location for potentially malicious user input in a path suspected to have vulnerabilities.

16. The apparatus of claim 14, wherein the vulnerability call trace is generated by identifying a path, suspected to have vulnerabilities, defining a sequence comprising a set of function calls and operations from an entry point associated with a user input to a corresponding sensitive location for potentially malicious user input.

17. The apparatus of claim 14, wherein the creating the unit test includes:
   converting the vulnerability call trace into a test method,
   creating a mock request object representing a mutated request object for a specified parameter of a request object identified in the vulnerability call trace, and
   creating a mock response object representing a mutated response object for a corresponding request object identified in the vulnerability call trace, and the mock response object contains validation logic for a specified vulnerability.

18. The apparatus of claim 17, wherein the creating the mock response object includes selectively replacing the request object identified in the vulnerability call trace with one of:
   a mock database access mechanism,
   a file system access, and
   a specified type of sink.

19. The apparatus of claim 14, wherein the at least one hardware processor is further configured to initiate and/or perform:
   marking, responsive to a determination that an identified vulnerability was not validated, a current static analysis as a false positive.

20. The apparatus of claim 14, wherein the executing the unit test includes modifying the generated mock objects to incorporate changes caused by filters in a processing path,
   the processing path processes:
      a request object by a filter before being passed to an application code, and
      a response object by a filter before being sent back to an HTTP client, to recreate effects of an environment on a mock request object and a mock response object used in the unit test.

\* \* \* \* \*